(12) United States Patent
Zunzer (10) Patent No.: US 12,508,887 B2
(45) Date of Patent: Dec. 30, 2025

(54) EDGE PROFILE OF A VEHICLE GLASS PANE

(71) Applicant: Webasto SE, Stockdorf (DE)

(72) Inventor: Andreas Josef Zunzer, Stockdorf (DE)

(73) Assignee: WEBASTO SE, Stockdorf (DE)

( * ) Notice: Subject to any disclaimer, the term of this patent is extended or adjusted under 35 U.S.C. 154(b) by 554 days.

(21) Appl. No.: 17/885,341

(22) Filed: Aug. 10, 2022

(65) Prior Publication Data

US 2023/0067519 A1 Mar. 2, 2023

(30) Foreign Application Priority Data

Aug. 17, 2021 (DE) ...................... 10 2021 121 376.2

(51) Int. Cl.
| | |
|---|---|
| *B60J 10/76* | (2016.01) |
| *B60J 1/00* | (2006.01) |
| *B60J 10/15* | (2016.01) |
| *B60J 10/34* | (2016.01) |
| *B60J 10/82* | (2016.01) |

(52) U.S. Cl.
CPC ............... *B60J 10/76* (2016.02); *B60J 1/007* (2013.01); *B60J 10/15* (2016.02); *B60J 10/34* (2016.02); *B60J 10/82* (2016.02)

(58) Field of Classification Search
CPC ... B60J 10/76; B60J 1/005; B60J 1/006; B60J 1/007; B60J 10/82; B60J 10/34; B62D 25/06
USPC ...... 296/215, 216.09, 6, 96.21, 201, 146.15; 52/204.62, 591, 208, 716.1, 718.01
See application file for complete search history.

(56) References Cited

U.S. PATENT DOCUMENTS

| | | | |
|---|---|---|---|
| 4,090,906 | A | 5/1978 | Zoller |
| 6,022,063 | A | 2/2000 | Frost |
| 2013/0278010 | A1 | 10/2013 | Kreye |
| 2020/0094662 | A1 | 3/2020 | De Paoli |

FOREIGN PATENT DOCUMENTS

| | | | | |
|---|---|---|---|---|
| CN | 1203553 | A | 12/1998 | |
| CN | 108990415 | A | 12/2018 | |
| DE | 3110914 | A1 | 10/1982 | |
| DE | 69713123 | T2 | 4/2003 | |
| DE | 102004010256 | B3 | 11/2004 | |
| DE | 202010016886 | U1 | 3/2011 | |
| DE | 202012103706 | U1 | 11/2012 | |
| FR | 2894865 | | * 6/2007 | |
| FR | 2894865 | A1 | * 6/2007 | ....... B29C 45/14377 |

(Continued)

OTHER PUBLICATIONS

First Examination report dated Mar. 22, 2022 of priority application in Germany (German with Machine Translation, 13 pages total).

(Continued)

*Primary Examiner* — Dennis H Pedder
(74) *Attorney, Agent, or Firm* — Fitch, Even, Tabin & Flannery, LLP (57) ABSTRACT

An edge profile of a glass pane of vehicle glazing, wherein the edge profile may have a plurality of distance pieces, which are arranged at a distance from one another along the edge profile, and that the edge profile attached to a pane edge defines with the distance pieces an installation position of the glass pane relative to a vehicle frame carrying the glass pane.

11 Claims, 5 Drawing Sheets

(56) References Cited

FOREIGN PATENT DOCUMENTS

| | | | |
|---|---|---|---|
| JP | 2586016 | * | 12/1998 |
| JP | 2586016 Y2 | * | 12/1998 |
| JP | 2006-110953 A | | 4/2006 |
| WO | 2005/084983 A1 | | 9/2005 |
| WO | 2014/131956 A1 | | 9/2014 |

OTHER PUBLICATIONS

Office Action issued in corresponding Chinese Application No. CN202210986862.0; mailed Jan. 8, 2025; In Chinese with English machine translation (27 pages).

Filler Manual, No. 7-80164-321-6; by George Wypych; dated Oct. 31, 2002; Beijing: China Petroleum & Chemical Industry Press, p. 403; in Chinese (3 pages); Cited in OA dated Jan. 8, 2025 from parallel CN Application; Applied in OA dated Jun. 23, 2025 from parallel CN Application.

Second Office Action issued in corresponding Chinese Application No. CN202210986862.0; mailed Jun. 23, 2025; in Chinese with English machine translation (10 pages).

* cited by examiner

EDGE PROFILE OF A VEHICLE GLASS PANE

CROSS-REFERENCE TO RELATED APPLICATION

This application claims priority from German Patent Application Number DE 10 2021 121 376.2, filed Aug. 17, 2020, which is hereby incorporated herein by reference in its entirety for all purposes.

FIELD

The invention relates to an edge profile of a glass pane of vehicle glazing. The invention furthermore relates to a method for producing such an edge profile, which can be attached to a pane edge of a glass pane of vehicle glazing, by extruding a plastics compound.

BACKGROUND

The practice of adhesively bonding glass panes or glass pane elements to roof frames or panoramic roof frames of vehicles is known. Distance pieces, also referred to as spacers, are used to correctly position the glass pane in its installed position on the vehicle roof frame. These distance pieces are adhesively bonded individually and at a distance from one another onto the inner side or underside of the glass pane or onto the steel or plastic frame adjacent to the pane edge in association with the roof frame. The distance pieces have a thickness which ensures that, when the glass pane is in its installed position on the roof frame, it occupies its correct or averaged position perpendicular to the vehicle outer surface or in the z direction.

Such glass panes can be provided with an edge profile. An edge profile of this kind is, for example, an edge protection strip. The edge protection strip is fastened to the glass pane to protect the pane edge. Such an edge profile can also be a sealing profile, which seals the glass panes in their installation positions with respect to adjacent vehicle components.

SUMMARY

The underlying object of the invention is that of providing an edge profile mentioned at the outset which improves the mounting of the glass pane in its installed position, and of specifying a method, mentioned at the outset, for producing such an edge profile.

The object is achieved according to the invention, in the case of the edge profile mentioned at the outset, by virtue of the fact that the edge profile has a plurality of distance pieces, which are arranged at a distance from one another along the edge profile, and that the edge profile attached to a glass pane edge defines with the distance pieces an installation position of the glass pane relative to a vehicle frame carrying the glass pane.

The object is furthermore achieved by means of a method having the features of claim 10. In this method, the edge profile is additionally extruded with a spacing web. Web material is removed from the spacing web in order to form web cutouts, with the result that a distance piece is formed in each case between two web cutouts.

The object is furthermore achieved by the extrusion or after the extrusion of the edge profile, distance pieces are integrally formed on or attached to the edge profile.

Advantageous embodiments of the edge profile according to the invention and of the respective method are specified in the dependent claims.

Since the edge profile according to the invention has the at least two distance pieces, which are also referred to as spacers, the distance pieces are also positioned in the correct position relative to or on the glass pane when the edge profile is attached to the glass pane or to the glass pane edge. Thus, the adhesive bonding of the individual distance pieces to the glass pane, which is known from the prior art and is expensive, and a respective individual pretreatment of the bonding points on the glass pane, to which the distance pieces are adhesively bonded, are eliminated. Such an edge profile can extend over at least one section of the glass pane edge or over the entire glass pane edge and thus over the entire circumference of the glass pane. Larger glass panes of vehicle glazing or of an FTM (fixed transparent module) can be positioned using, for example, 12 to 16 distance pieces when they are fastened and, in particular, adhesively bonded to a vehicle frame, roof frame or module frame or the like. The handling and assembly effort to be saved by the edge profiles according to the invention is therefore considerable. This also eliminates possible problems in the adhesive bonding and adhesion of the distance pieces to the glass pane in the case of small bonding areas of the distance pieces and possible tilt loading of the distance pieces during assembly. Vehicle frame is generally the term used to refer to the component of the vehicle, of the vehicle roof or of a component to be attached to the vehicle roof to which the glass pane is attached or adhesively bonded.

An edge profile of this kind is, in particular, an edge protection profile or a sealing profile or a combined edge profile and edge protection/sealing profile consisting of an edge protection profile and a sealing profile. The edge profile is an elongate or strip-type profile and, in particular, an elongate or strip-type plastics profile. Such an edge profile can be arranged either directly on a pane edge of a glass pane or on the pane inner side or pane underside in a pane edge region at a certain distance from the pane edge. Such an edge profile can also be an additional edge profile offset inward from the pane edge, the edge profile thus forming a carrier profile for distance pieces, in particular without an edge protection or sealing function. The pane inner side or pane underside relates to the installation position of the glass pane, e.g. on a vehicle roof of a passenger car.

Provision is expediently made for each distance piece to project from the edge profile, in particular in a direction away from a pane inner side or pane underside of the glass pane or in the direction of a fastening point of the glass pane on a vehicle frame or the like.

The thickness or height of the respective distance piece is determined in such a way that, together with the edge profile or that part of the edge profile to which the distance piece is attached or on which it is integrally formed, it provides the defined spacing between the glass pane and the vehicle frame.

The distance pieces can have identical thicknesses or heights, particularly in the case where the vehicle frame and the glass pane are matched to one another in such a way that, in the installed position of the glass pane, a constant distance or gap remains between the glass pane and the vehicle frame. On the other hand, it is also possible to provide distance pieces of different thicknesses or heights, which permit adaptation to a distance or gap whose distance dimension or gap dimension changes in a direction along the edge of the glass pane.

The distance pieces can be arranged on the edge profile on or along a line which runs parallel to the elongate edge profile. The distance pieces are thus arranged in alignment with one another. On the other hand, it is also possible for at least two distance pieces to be offset from one another with respect to the longitudinal extent of the edge profile. It is thus possible, for example, in the case of an edge protection profile, for some distance pieces to be arranged close to a front edge of the edge protection profile, whereas other distance pieces can be arranged further away from the front edge and offset inward in the transverse direction.

According to a preferred embodiment, provision is made for the edge profile to have a base leg, which is provided on its inner side facing the glass pane for arrangement or fastening on a pane inner side or pane underside. The base leg is connected via its inner side or inner surface to the pane underside or pane inner surface and, in particular, is adhesively bonded, e.g. by means of an adhesive tape or an adhesive strip. On its outer side or outer surface opposite its inner side, the base leg has the distance pieces, in particular in a position opposite to the adhesive bond or the adhesive tape or adhesive strip. The distance pieces project from the base leg of the edge profile. By means of the adhesive bond and on account of its dimensional stability, the base leg offers positionally stable positioning of the distance pieces when the edge profile is attached to the glass pane and the glass pane is fastened to the vehicle frame. The required thickness of the distance piece is thus determined as a function of the thickness of the base leg and the adhesive bond.

It is furthermore preferred for each distance piece to have a bearing surface, which is arranged on the vehicle frame in the installation position of the glass pane. The distance piece is expediently shaped in such a way that the bearing surface is, for example, rectangular and, in particular, parallel to the base leg or to its outer surface.

The edge profile is preferably produced as an extruded plastics part and, in particular, from a thermoplastic material, preferably from ASA (acrylonitrile styrene acrylate), from ASA plus a soft component ASA (2K), from EPDM or from EPDM plus a soft component EPDM (2K). ASA has high weather and UV resistance and is hard, impact-resistant and largely scratch-proof. In particular, at least the base leg of the edge profile is formed as a deformation-resistant plastics profile. A sealing profile can be extruded with a hard base leg which is resistant to deformation and to which a soft, deformable sealing profile portion is coextruded. The distance piece is expediently likewise formed or extruded on the base leg as a comparatively deformation-resistant component, for example as a spacing web, from which web material is removed or cut out in a region or section of the spacing web, with the result that a distance piece remains in each case between two such web cutouts.

In the case of the edge profile according to the invention, therefore, according to a preferred embodiment, it is envisaged that each distance piece is integrally formed on the edge profile produced as an extruded plastics part and, in particular, is extruded or coextruded on or with the edge profile. On the other hand, provision can also be made for each distance piece to be attached to the edge profile as an additional component and, in particular, to be adhesively bonded thereto.

The invention also provides a glass pane of vehicle glazing having at least one such edge profile with distance pieces. Such an edge profile can be arranged either directly on a pane edge of a glass pane or on the pane underside in a pane edge region at a certain distance from the pane edge. Such an edge profile can also be an additional edge profile offset inward from the pane edge of the glass pane, the edge profile thus forming a carrier profile for distance pieces, in particular without an edge protection or sealing function.

Furthermore, the invention also provides a vehicle having vehicle glazing which has such a glass pane mentioned above.

In the method according to the invention as per claim 10, the distance pieces are produced in an extrusion process. In this method, the edge profile is additionally extruded with at least one spacing web. The spacing web is preferably integrally formed on the base leg. Web material is removed from the spacing web in order to form web cutouts, with the result that a distance piece is formed in each case between two web cutouts. In the case of two different spacing webs, distance pieces can be produced in different positions, e.g. in alignment and not in alignment.

The spacing web is expediently formed or extruded as a thickened portion of the base leg. The thickened portion is preferably situated opposite the base leg inner side, which can be fixed to the glass pane by adhesive bonding. The web material can then preferably be removed by horizontal cutting or by horizontal punching. Such a horizontal cut or horizontal punching takes place substantially parallel to the base leg of the edge profile.

A cut for cutting out web material can also be carried out by means of a blade arranged in a stationary manner downstream of the extrusion head in the extrusion direction, or by means of a blade or cutting edge which is taken along with the extruded edge profile. In this case, the web material or the web cutout can be cut out, for example, with a curved contour or cutting line or with a sinusoidal contour or cutting line.

According to an alternative procedure, the spacing web is formed on the base leg as an extension of the base leg beyond its region intended for adhesive bonding. The web material can then preferably be removed by vertical cutting or by vertical punching. Such a vertical cut or vertical punching takes place substantially perpendicularly to the edge profile base leg which can be attached to the pane inner side or pane underside.

In the method according to the invention, during the extrusion or after the extrusion of the edge profile, distance pieces are integrally formed on or attached to the edge profile and, in particular, to the base leg of the edge profile.

The distance pieces are expediently integrally formed on the edge profile or on the base leg by coextrusion during extrusion. The distance pieces are formed locally intermittently directly during extrusion, e.g. by means of plastics material fed from a second feed channel for plastics material on the extruder or extrusion head, in particular in parallel with or alternatively downstream of the extrusion of the edge profile.

According to an alternative method variant, provision can be made for the distance pieces to be attached to the edge profile and, in particular, to be adhesively bonded to it after extrusion. In this case, the distance pieces can be attached or adhesively bonded to the edge profile or to the base leg as independent components, for example following extrusion and expediently immediately following the extruder. On the other hand, it is also possible for the distance pieces to be applied in a later method step following extrusion, for example during the assembly of the edge profile with the distance pieces specified for an intended use, before the attachment of the edge profile to the glass pane.

The invention is explained in greater detail below with reference to the drawing by means of exemplary embodiments of edge profiles according to the invention and methods for producing such an edge profile. In the drawing.

BRIEF DESCRIPTIONS OF THE DRAWINGS

DETAILED DESCRIPTION

Figure 1:
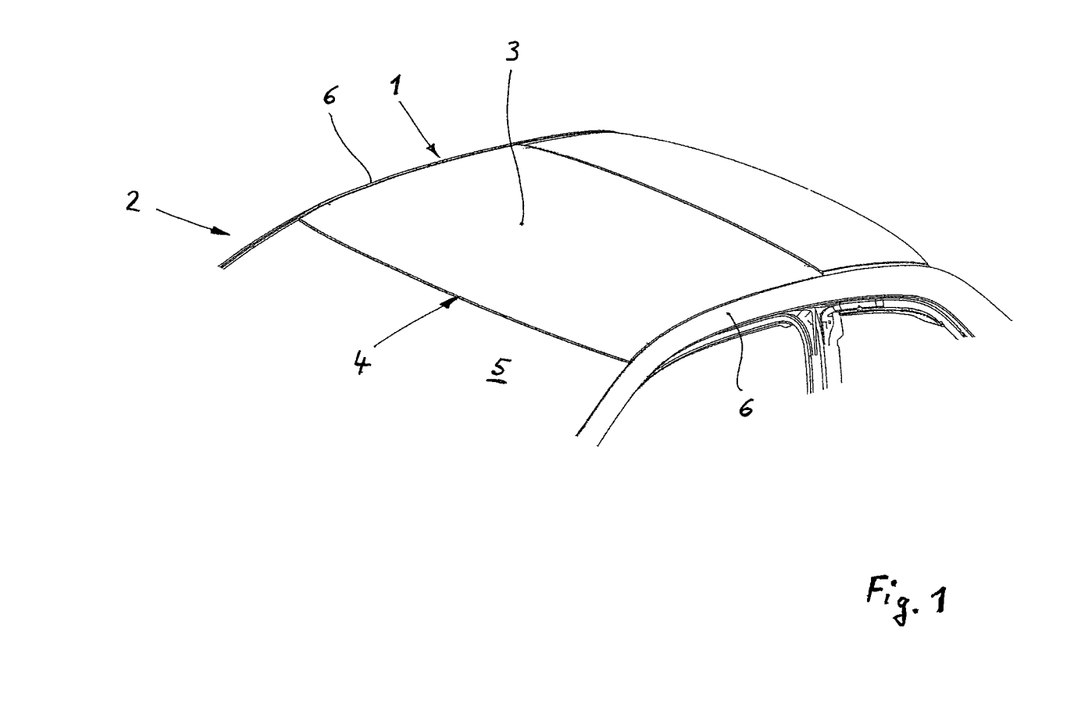
FIG. 1 shows an isometric view of a vehicle roof with a glass pane which, adjoining a windshield, covers a surface area of the vehicle roof.

A vehicle roof 1 (see FIG. 1) of a vehicle 2, such as a passenger car, has a glass pane 3, the front pane edge 4 of which is adjacent to a windshield 5 and which is arranged on both sides on lateral roof longitudinal beams 6. Such a glass pane 3 is, for example, part of a roof module or FTM (fixed transparent module). The glass pane 3 is expediently fastened to the vehicle roof 1 by means of adhesive bonding, e.g. by means of a bead of adhesive 7. At least the front pane edge 4 of the glass pane 3 is provided with an edge profile 8 (FIG. 2), which forms an edge protection profile. The edge profile 8 is expediently formed as a deformation-resistant plastics profile. In particular, the edge profile 8 is produced by extrusion from a thermoplastic such as, for example, from ASA.

Figure 2:
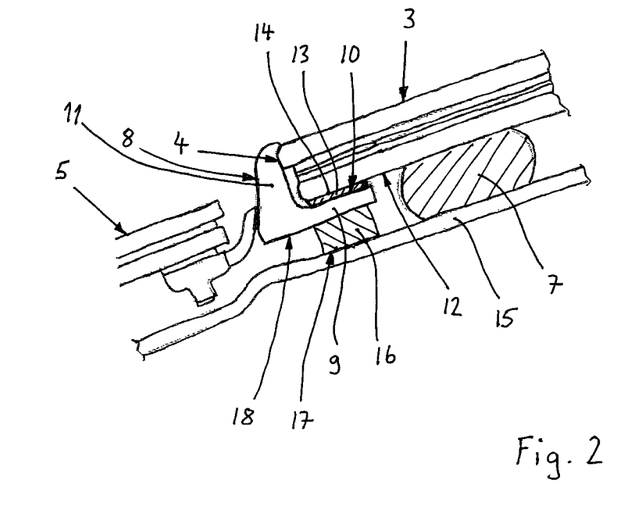
FIG. 2 shows a longitudinal sectional view of a vehicle frame of the vehicle roof with the glass pane attached thereto and an edge profile, which is attached to the front pane edge and forms an edge protection strip.

The edge profile 8 is fastened to the glass pane 3, which is, for example, a multilayer laminated safety glass (FIG. 2). The edge profile 8 has a base leg 9, which contains a fastening or adhesive surface on its inner side 10 or inner surface facing the glass pane 3. Furthermore, the edge profile 8 has a protective leg 11, which is angled with respect to the base leg 9 and is formed substantially at right angles to the base leg 9. The edge profile 8 is fastened by means of its base leg 9 to a pane inner side or pane underside 12 of the glass pane 3 by means of an adhesive bond 13. The adhesive bond 13 is produced, for example, by means of a layer of adhesive or an adhesive tape on the fastening or adhesive surface on the inner side 10 of the base leg 9, on the one hand, and on an edge strip 14, adjoining the pane edge 4, of the pane underside 12 of the glass pane 3, on the other hand.

The glass pane 3 is fastened or adhesively bonded to a vehicle frame 15 by means of the bead of adhesive 7. The bead of adhesive 7 extends inwardly of the edge profile 8 along the pane edge 4. The vehicle frame 15 is, for example, a roof frame of the vehicle roof or of the vehicle body or a frame of a roof module or FTM. The edge profile 8 has a plurality of distance pieces 16 (illustrated schematically in FIG. 4), which are arranged at a distance from one another along the edge profile 8. Each distance piece 16 is arranged between the base leg 9 and the vehicle frame 15 and rests by means of a bearing surface 17 against the vehicle frame 15. The distance pieces 16 define an installation position of the glass pane 3 relative to the vehicle frame 15 carrying the glass pane 3 by setting the spacing between the edge profile 8 and the vehicle frame 15.

Figures 3, 4:
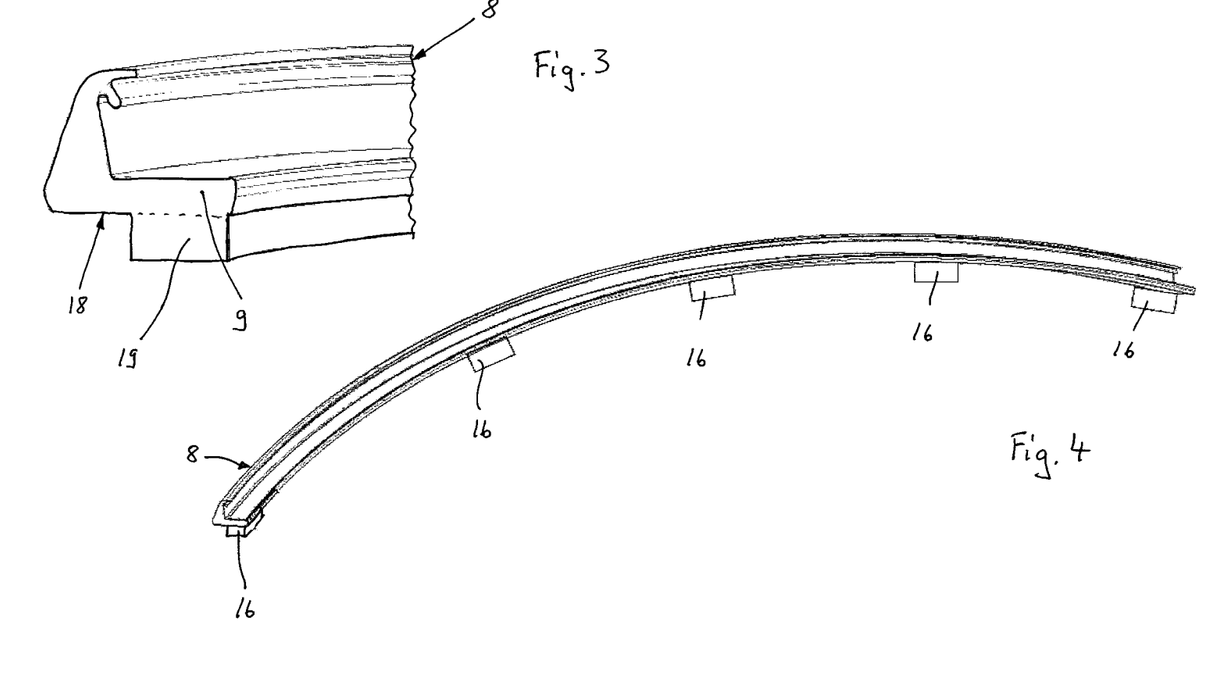
FIG. 3 shows a plan view of an edge profile with a spacing web integrally formed on a base leg of the edge profile in order to form a distance piece.
FIG. 4 shows a plan view of an edge profile with a plurality of distance pieces arranged at a distance from one another over its length.

Preferably, the distance pieces 16 are produced as extruded plastics parts which are extruded or coextruded on the base leg 9 during the production or extrusion of the edge profile 8. The distance pieces 16 can be produced as thermoplastic parts, in the case of edge protection profiles for example, or as elastomeric parts, from EPDM for example, as in the case of sealing profiles produced therefrom. The distance pieces 16 then project downward, starting from an outer side 18 of the base leg 9, or opposite the inner side 10 of the base leg 9.

A method according to the invention for producing such an edge profile 8 envisages that the edge profile 8 is extruded with an additional spacing web 19 (FIG. 3). The spacing web 19 is expediently integrally formed or coextruded on the underside or outer side 18 of the base leg 9 with a cross-sectional shape which corresponds to that of the distance piece 16 to be formed. The distance piece 16 is produced by removing or cutting out web material of the spacing web 19 from the spacing web 19 in a region or section between two distance pieces 16 to be formed. Two adjacent distance pieces 16 are thus separated from one another by a web cutout 20 formed during this process (see FIG. 6).

Figure 6:
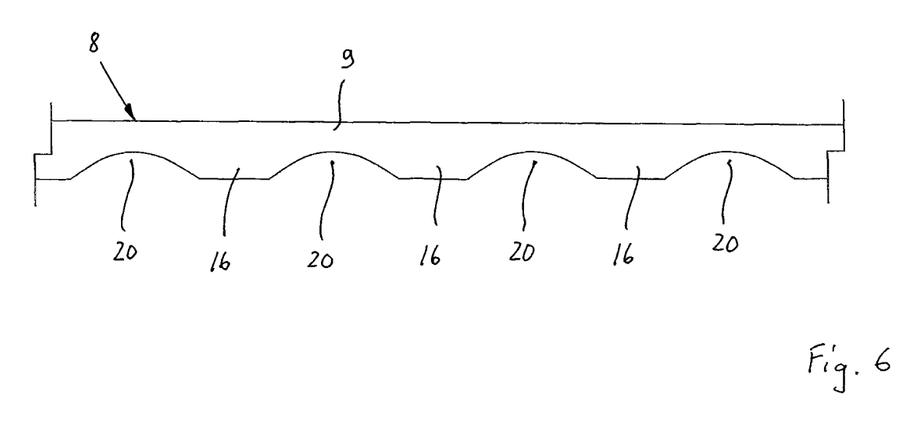
FIG. 6 shows a side view of an edge profile with a plurality of distance pieces integrally formed thereon.

Such a web cutout 20 can be made, in particular immediately after the extrusion of the edge profile 8 for example, by a cut with a knife or a blade, which is expediently taken along with the edge profile as it moves following the extrusion operation and, in the process, cuts out the web cutout 20, e.g. in wave form and, in particular, in sinusoidal wave form (FIG. 6).

It is also possible to produce a respective web cutout 20 by removing the web material by means of a cut which is, for example, horizontal, or by means of horizontal punching or parallel to the base leg 9 of the edge profile 8.

Figure 5:
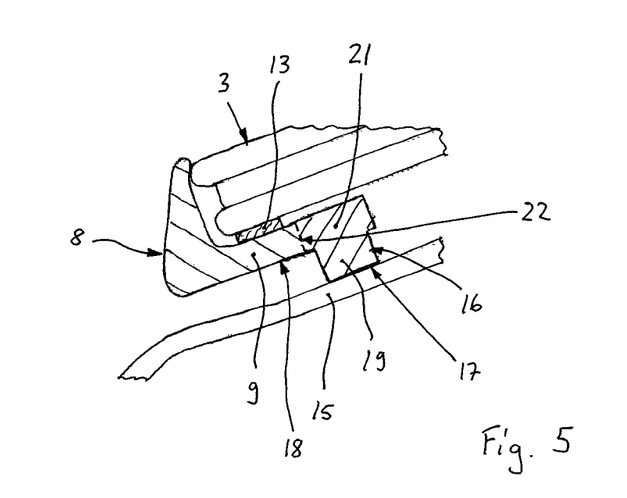
FIG. 5 shows a sectional view of another embodiment of an edge profile with a distance piece.

On the other hand, it is also possible to produce a respective web cutout 20 by removing the web material by means of a cut which is, for example, vertical, or by means of vertical punching or perpendicularly to the base leg 9 of the edge profile 8. FIG. 5 shows an embodiment of the edge profile 8 in which a spacing web 19 is formed as part of an extension 21 of the base leg 9, which extension is integrally formed so as to extend beyond an end face 22 on the end of the base leg 9. By means of vertical cuts, web material is cut out of the extension 21 and the spacing web 19 in order to form a respective web cutout 20 between two remaining distance pieces 16.

On the other hand, the distance pieces 16 can also be attached to the edge profile or to the base leg 9 of the edge profile 8 as additional components and, in particular, can be adhesively bonded to the base leg 9.

The invention claimed is:

1. An edge profile of a glass pane of vehicle glazing,
   wherein the edge profile has a plurality of distance pieces, which are arranged at a distance from one another along the edge profile, and
   the edge profile attached to a pane edge defines with the distance pieces an installation position of the glass pane relative to a vehicle frame carrying the glass pane, and
   wherein each of the distance pieces are extruded or coextruded on the edge profile produced as an extruded plastics part.

2. The edge profile as claimed in claim 1, wherein each distance piece projects from the edge profile in a direction away from a pane inner side or pane underside of the glass pane.

3. The edge profile as claimed in claim 1, wherein each distance piece has a bearing surface, which is arranged on the vehicle frame in the installation position of the glass pane.

4. The edge profile as claimed in claim 1, wherein the edge profile has a base leg, which is provided on its inner side facing the glass pane, for arrangement or fastening on a pane inner side or pane underside, and has the distance pieces on its outer side, which is opposite its inner side.

5. The edge profile as claimed in claim 1, wherein the edge profile is produced as an extruded plastics part from a thermoplastic material from one of ASA (acrylonitrile styrene acrylate), ASA plus a soft component ASA (2K), EPDM and EPDM plus a soft component EPDM (2K).

6. The edge profile as claimed in claim 1, wherein the edge profile is an edge protection profile.

7. A glass pane of vehicle glazing having an edge profile as claimed in claim 1.

8. A vehicle having vehicle glazing which has a glass pane as claimed in claim 7.

9. A method for producing an edge profile, which can be attached to a pane edge of a glass pane of vehicle glazing,
   wherein the edge profile has a plurality of distance pieces, which are arranged at a distance from one another along the edge profile, and
   the edge profile attached to a pane edge defines with the distance pieces an installation position of the glass pane relative to a vehicle frame carrying the glass pane,
   by extruding a plastics compound, wherein the edge profile is extruded with at least one additional spacing web, and web material is removed from the spacing web in order to form web cutouts, with the result that a distance piece is formed in each case between two web cutouts.

10. The method as claimed in claim 9, wherein the web material is removed by horizontal cutting or by horizontal punching or parallel to a base leg of the edge profile, which leg can be attached to the pane inner side or pane underside, or by vertical cutting or by vertical punching or perpendicularly to a base leg of the edge profile, which leg can be attached to the pane inner side or pane underside.

11. A method for producing an edge profile, which can be attached to a pane edge of a glass pane of vehicle glazing,
   wherein the edge profile has a plurality of distance pieces, which are arranged at a distance from one another along the edge profile, and
   the edge profile attached to a pane edge defines with the distance pieces an installation position of the glass pane relative to a vehicle frame carrying the glass pane, and
   wherein each of the distance pieces are extruded or coextruded on the edge profile produced as an extruded plastics part,
   by extruding a plastics compound, wherein, during the extrusion or after the extrusion of the edge profile, distance pieces are integrally formed on or attached to the edge,
   wherein the distance pieces are integrally formed on the edge profile by coextrusion during extrusion.

* * * * *